(12) United States Patent
de Leon

(10) Patent No.: US 10,083,288 B2
(45) Date of Patent: Sep. 25, 2018

(54) ELECTRONIC DEVICE WITH PARALLAXING UNLOCK SCREEN AND METHOD

(71) Applicant: Sony Corporation, Tokyo (JP)

(72) Inventor: David de Leon, Lund (SE)

(73) Assignee: Sony Corporation and Sony Mobile Communications, Inc., Toyko (JP)

( * ) Notice: Subject to any disclaimer, the term of this patent is extended or adjusted under 35 U.S.C. 154(b) by 199 days.

(21) Appl. No.: 14/413,085

(22) PCT Filed: Mar. 25, 2014

(86) PCT No.: PCT/IB2014/060147
§ 371 (c)(1),
(2) Date: Jan. 6, 2015

(87) PCT Pub. No.: WO2015/145203
PCT Pub. Date: Oct. 1, 2015

(65) Prior Publication Data
US 2016/0275283 A1    Sep. 22, 2016

(51) Int. Cl.
| | |
|---|---|
| *G06F 13/00* | (2006.01) |
| *G06F 21/36* | (2013.01) |
| *G06F 3/0481* | (2013.01) |
| *G09G 5/36* | (2006.01) |
| *G06F 3/041* | (2006.01) |
| *H04N 13/00* | (2018.01) |
| *G09G 3/14* | (2006.01) |

(52) U.S. Cl.
CPC ............ *G06F 21/36* (2013.01); *G06F 3/0416* (2013.01); *G06F 3/04815* (2013.01); *G09G 5/36* (2013.01); *G09G 3/14* (2013.01); *G09G 2330/022* (2013.01); *G09G 2354/00* (2013.01); *G09G 2358/00* (2013.01); *G09G 2370/022* (2013.01); *H04N 13/00* (2013.01)

(58) Field of Classification Search
USPC .......................................................... 726/19
See application file for complete search history.

(56) References Cited

U.S. PATENT DOCUMENTS

| | | | |
|---|---|---|---|
| 7,305,105 B2 * | 12/2007 | Chosson | G07D 7/0013 380/258 |
| 8,090,201 B2 | 1/2012 | de Leon | |

(Continued)

FOREIGN PATENT DOCUMENTS

EP    2682889 A1    1/2014

OTHER PUBLICATIONS

International Search Report and Written Opinion dated Dec. 2, 2014 for corresponding International Application No. PCT/IB2014/060147.

*Primary Examiner* — Amare F Tabor
(74) *Attorney, Agent, or Firm* — Renner, Otto, Boisselle & Sklar, LLP

(57) ABSTRACT

Unlocking an electronic device includes displaying a lock screen containing a simulated parallaxing three-dimensional scene on a touch screen of the electronic device; receiving user input gestures on the touch screen; parallaxing the displayed scene in accordance with the input gestures; and determining if the input gestures satisfy input requirements to unlock the electronic device and, if so, unlock the electronic device.

14 Claims, 5 Drawing Sheets

(56) References Cited

U.S. PATENT DOCUMENTS

| | | | |
|---|---|---|---|
| 8,863,271 B2* | 10/2014 | Griffin | G09C 5/00 |
| | | | 726/16 |
| 9,069,932 B2* | 6/2015 | Bruck | G06F 21/00 |
| 9,182,827 B2* | 11/2015 | Sudo | G06F 3/0481 |
| 9,189,073 B2* | 11/2015 | Mongia | G06F 1/3231 |
| 9,477,313 B2* | 10/2016 | Mistry | G06F 3/014 |
| 9,619,105 B1* | 4/2017 | Dal Mutto | G06F 3/04815 |
| 9,696,808 B2* | 7/2017 | Nishihara | G06F 3/017 |
| 2007/0139371 A1* | 6/2007 | Harsham | G06F 3/011 |
| | | | 345/156 |
| 2008/0232584 A1* | 9/2008 | Gougeon | G06K 19/06046 |
| | | | 380/54 |
| 2009/0310185 A1* | 12/2009 | Phelan | G06Q 30/00 |
| | | | 358/3.28 |
| 2010/0107068 A1* | 4/2010 | Butcher | G06F 3/0482 |
| | | | 715/702 |
| 2011/0007000 A1 | 1/2011 | Lim | |
| 2011/0179368 A1* | 7/2011 | King | G06F 3/04815 |
| | | | 715/769 |
| 2012/0027267 A1* | 2/2012 | Kim | G06F 3/0418 |
| | | | 382/118 |
| 2012/0159608 A1 | 6/2012 | Griffin | |
| 2012/0172119 A1* | 7/2012 | Kelly | G07F 17/3211 |
| | | | 463/31 |
| 2013/0117717 A1* | 5/2013 | Song | G06F 3/016 |
| | | | 715/852 |
| 2013/0147795 A1 | 6/2013 | Kanguk et al. | |
| 2014/0013414 A1* | 1/2014 | Bruck | G06F 21/36 |
| | | | 726/16 |
| 2014/0115691 A1* | 4/2014 | Yang | G06F 21/00 |
| | | | 726/16 |
| 2014/0181957 A1* | 6/2014 | Nguyen | G06F 21/36 |
| | | | 726/19 |
| 2014/0195983 A1* | 7/2014 | Du | G06F 3/038 |
| | | | 715/849 |
| 2016/0055330 A1* | 2/2016 | Morishita | G06F 21/36 |
| | | | 726/19 |

* cited by examiner

ELECTRONIC DEVICE WITH PARALLAXING UNLOCK SCREEN AND METHOD

TECHNICAL FIELD OF THE INVENTION

The technology of the present disclosure relates generally to electronic devices and, more particularly, to an electronic device and a related method for unlocking the electronic device by user interaction with a simulated parallaxing three-dimensional scene.

BACKGROUND

Many modern electronic devices employ authentication techniques that involve a lock screen to control access to full functionality of the electronic device. These screenlock solutions reduce unauthorized access to the device. To unlock the device, the user may enter a correct personal identification number (PIN) (e.g., typically a four digit number), enter a correct password (e.g., a series of alpha-numeric characters), pass a biometric scan (e.g., fingerprint swipe, face recognition, etc.), or manipulate or arrange items in a correct pattern or sequence (sometimes referred to as pattern unlock).

These solutions can have drawbacks. For instance, a picture of an authorized user may unlock a device that is protected with face recognition protection (also referred to as face unlock). As another example, PIN codes and passwords are difficult to remember, especially after a prolonged period of non-use or recently after changing the code or password. Pattern unlock may be circumvented by a recognizable residual smudge that is left of the face of the display.

SUMMARY

The disclosed techniques for electronic device access control involve a screen-based unlock feature with a relatively fast and easy to remember unlocking action that provides a reasonable level of access security. Unlocking an electronic device may include "dragging on" a displayed parallaxing three-dimensional scene to reveal a predetermined target object.

According to one aspect of the disclosure, a method of unlocking an electronic device includes displaying a lock screen containing a simulated parallaxing three-dimensional scene on a touch screen of the electronic device; receiving user input gestures on the touch screen; parallaxing the displayed scene in accordance with the input gestures; and determining if the input gestures satisfy input requirements to unlock the electronic device and, if so, unlock the electronic device.

According to an embodiment of the method, the input gestures satisfy the input requirements to unlock the electronic device if the parallaxing of the displayed scene in accordance with the input gestures reveals a predetermined target object that is hidden by a scenery object prior to parallaxing of the displayed scene in accordance with the input gestures.

According to an embodiment of the method, the determining is made following an end of a user input gesture sequence.

According to an embodiment of the method, the end of the user input gesture sequence comprises a finger lift from the touch screen.

According to an embodiment of the method, the gestures satisfy the input requirements to unlock the electronic device if the revealing of the hidden object is accomplished by two or more distinct motions performed in a predetermined order.

According to an embodiment of the method, the gestures satisfy the input requirements to unlock the electronic device if two or more hidden objects are revealed in a predetermined order.

According to an embodiment of the method, a location of the hidden object in the displayed scene changes in a subsequent displaying of the lock screen.

According to an embodiment of the method, a starting vantage point of the displayed scene changes in a subsequent displaying of the lock screen.

According to an embodiment of the method, the parallaxing of the displayed scene reveals a hidden object, and the method further includes animating or changing a characteristic of the revealed object.

According to one aspect of the disclosure, an electronic device having a locked state in which a function of the electronic is unusable and an unlocked state in which the function is usable includes a touch screen and a control circuit. The control unit is configured to display a lock screen containing a simulated parallaxing three-dimensional scene on the touch screen; receive signals corresponding to user input gestures on the touch screen; parallax the displayed scene in accordance with the input gestures; and determine if the input gestures satisfy input requirements to unlock the electronic device and, if so, unlock the electronic device.

According to an embodiment of the electronic device, the input gestures satisfy the input requirements to unlock the electronic device if the parallaxing of the displayed scene in accordance with the input gestures reveals a predetermined target object that is hidden by a scenery object prior to parallaxing of the displayed scene in accordance with the input gestures.

According to an embodiment of the electronic device, the determination is made following an end of a user input gesture sequence.

According to an embodiment of the electronic device, the end of the user input gesture sequence comprises a finger lift from the touch screen.

According to an embodiment of the electronic device, the gestures satisfy the input requirements to unlock the electronic device if the revealing of the hidden object is accomplished by two or more distinct motions performed in a predetermined order.

According to an embodiment of the electronic device, the gestures satisfy the input requirements to unlock the electronic device if two or more hidden objects are revealed in a predetermined order.

According to an embodiment of the electronic device, a location of the hidden object in the displayed scene changes in a subsequent displaying of the lock screen.

According to an embodiment of the electronic device, a starting vantage point of the displayed scene changes in a subsequent displaying of the lock screen.

According to an embodiment of the electronic device, the parallaxing of the displayed scene reveals a hidden object and the controller initiates an animation or a change in a characteristic of the revealed object.

DETAILED DESCRIPTION OF EMBODIMENTS

Figure 1:
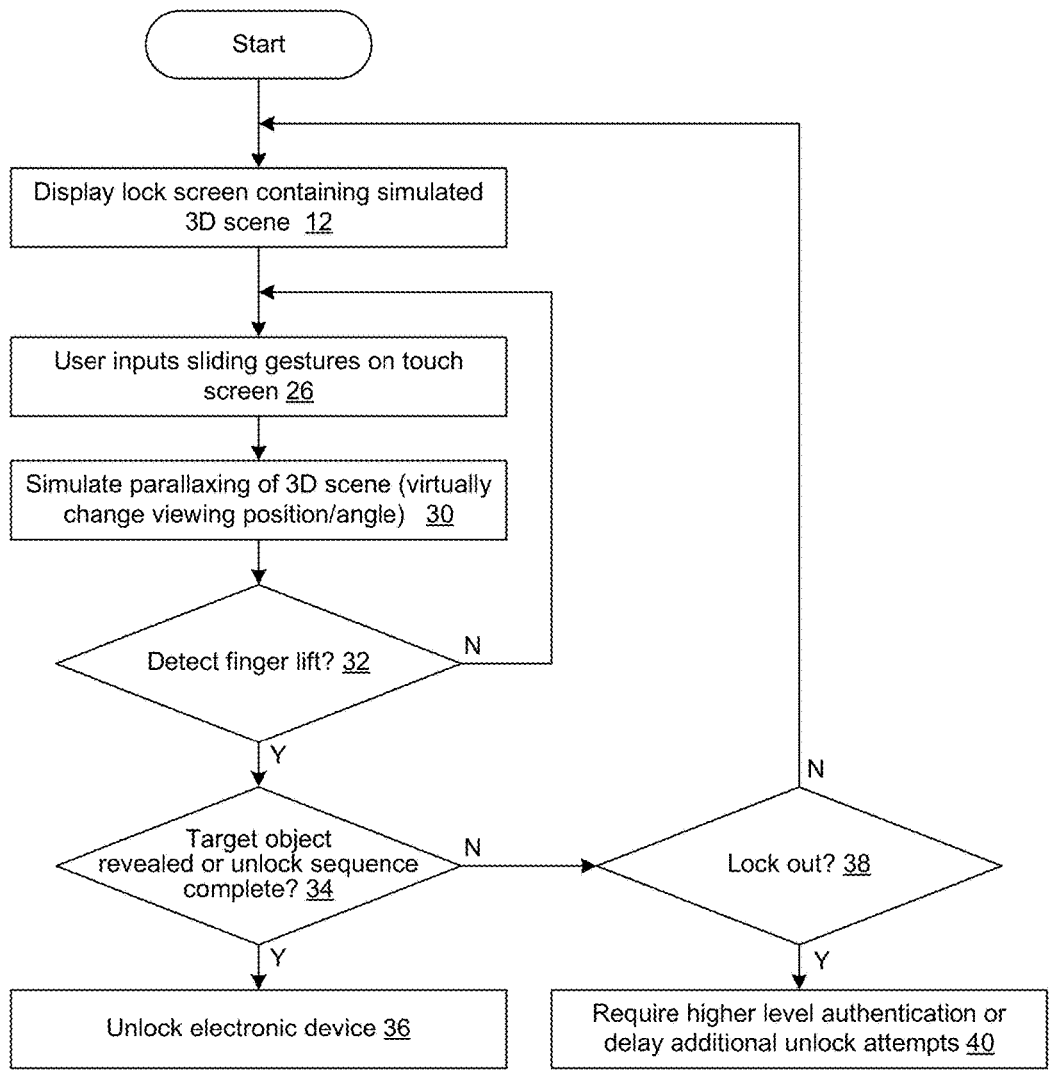
FIG. 1 is a flow diagram of device lock functions carried out by an electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling access to functionality of the electronic device. The electronic device is typically—but not necessarily—a portable electronic device, and may take any form factor including, but not limited to, a mobile telephone, a tablet computing device, a laptop computer, a gaming device, a camera, or a media player. The electronic device shown in the appended figures is a mobile telephone, but applicability of aspects of the invention is not limited to mobile telephones.

With initial reference to FIG. 1, illustrated is an exemplary flow diagram representing steps that may be carried out by an electronic device 10 (FIG. 3) to control access to functions of the electronic device 10. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

At the start of the logical flow, the electronic device 10 may be in a locked state. In a locked state, a user of the electronic device 10 does not have access to full functionality of the electronic device 10, such as launching and using applications, making phone calls, preparing and sending messages, and so forth. In the locked state, limited operations may be carried out such as, but not limited to, placing an emergency phone call, taking photos, and answering incoming calls.

Figure 2A:
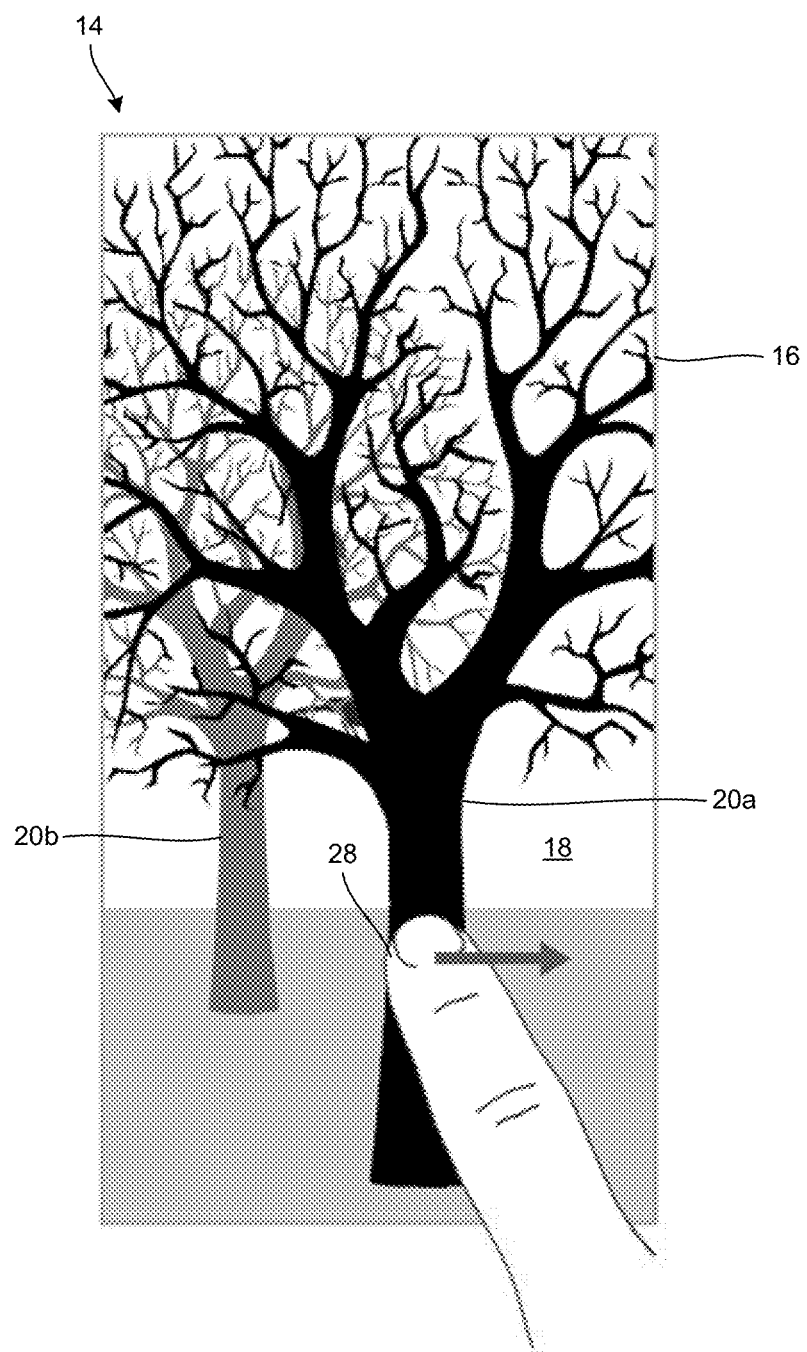
FIGS. 2A-2C are representative scene shots during user interaction with the electronic device to unlock the electronic device.

With additional reference to FIG. 2A, the logical flow may start in block 12 in which the electronic device 10 may display a lock screen 14 on a display 16 of the electronic device 10. The display 16 includes touch-input functionality to receive touch inputs from a user. Therefore, the display 16 also may be referred to as a touch screen. The lock screen 14 may be displayed in response to an activation or wake-up action with the electronic device 10 when the electronic device 10 is in the locked state. These actions may include, for example, touching the display 16, pressing a button of the electronic device 10, shaking the electronic device 10, etc.

The lock screen 14 shows a scene 18. The scene 18 is a simulated parallaxing three-dimensional scene with which the user may interact by touching the display 16 at any location in the scene 18 and make swiping motions across the surface of the display 16. For example, as the user drags a fingertip 28 across the surface of the display 16, the displayed scene 18 changes to simulate a change in the user's viewing position relative to the scene 18. Thus, the swiping motion of the user simulates parallaxing of the scene 18 as a function of the speed, direction, and length of the swipe.

The scene 18 contains various types of objects at different levels of depth. The objects include scenery objects 20 and hidden objects 22, where at least one of the hidden objects 22 is predetermined to be an unlock object, also referred to as a target object 24 (FIG. 2C). In the illustrated example of the scene 18 for the lock scene 14, the scenery objects 20 are trees and the hidden objects 22 are birds. It will be understood that the illustration of trees and birds is exemplary. Thus, the scenery objects 20 and the hidden objects 22 may represent any appropriate object limited only by the imagination of the creator of the scene 18. Other examples of scenery objects 20 include, but are not limited to, buildings, cars, furniture, and geometrical objects such as cones, cubes and spheres. Other examples of hidden objects 22 include, but are not limited to shoes, cars, sports articles, flowers, and geometrical objects or shapes. In one embodiment, the hidden objects 22 each have a different characteristic such as a different color (e.g., in the illustrated example where the hidden objects 22 are birds, there may be a blue bird 22a, a red bird 22b and a green bird 22c). Each scenery object 20 need not be the same type of object (e.g., as one representative example, the scene 18 could have a mix of tress, rocks and buildings) and/or each hidden object 22 need not be the same type of object (e.g., as one representative example, the scene could have a mix different types of animals such as birds, monkeys and squirrels).

As another example, the hidden objects 22 may be images of faces of persons. The images may be taken from photos stored by the electronic device 10 in a photo album or associated with a contacts database. In this manner, the persons represented by the hidden objects 20 may be known to the user. In one embodiment, the scene 18, the scenery objects 20 and/or the hidden objects 22 (e.g., in the form of objects from an object database or from stored images) are selected by the user during a configuration session.

Following display of the lock screen 14 in block 12, the logical flow may proceed to block 26 where user interaction with the touch-screen display 16 is detected. The user interaction may include sliding gestures, also referred to as swipes of a fingertip 28 against the display 16. The movement may include movements in a horizontal direction relative to the displayed scene 18 (e.g., movements from left to right or from right to left), movements in a vertical direction relative to the displayed scene 18 (e.g., movements from top to bottom or from bottom to top), or a combination movement (also referred to a diagonal movement) that contains a horizontal component and a vertical component.

When a user input that includes a sliding gesture is detected, the logical flow may proceed to block 30. In block 30, the scene 18 is refreshed in response to the movement. The refreshing of the scene 18 includes parallaxing the scene 18 to simulate a change in viewing position or viewing angle 18 of the scene 18. The amount of simulated parallaxing movement of the scene 18 is proportional to the length of the swipe by the user. Also, the speed and direction of the simulated parallaxing movement are proportional to the speed and direction of the swipe by the user.

Parallaxing of the scene 18 involves changing the relative position of the displayed scenery objects 20 and hidden objects 22 as the simulated viewpoint moves in conjunction with user interaction with the display 16. More specifically, as the scene 18 is refreshed, scenery objects 20 simulated to be in the background of the scene 18 appear to move slower than scenery objects 20 simulated to be in the foreground of the scene 18. The relative movements are controlled so that the displacement in the apparent position of a scenery object 20 is viewed along the different simulated lines of sight as controlled by the user's gestures.

As the scene 18 parallaxes, the hidden objects 22 come into view and become revealed depending on their location in the scene 18 relative to the scenery objects 20. In one embodiment, a hidden object 22 that comes into view will appear to remain stationary relative to the scene 18. Even if the revealed object appears to remain stationary relative to the scene 18, the revealed object may still undergo simulated parallaxing with the scenery objects 20. In another embodiment, one or more of the hidden objects 22 may be configured to change when revealed due to the simulated parallaxing of the scene 18. A change in a revealed object may include movement of the object relative to the scene 18 by performance of an animation or a change in a characteristic of the object (e.g., a change color). In the illustrated example of birds and trees, revealing of a bird may trigger animation of the bird. For instance, the revealed bird may become animated and appear to fly from one branch on which it is perched to another branch.

Figure 2B:
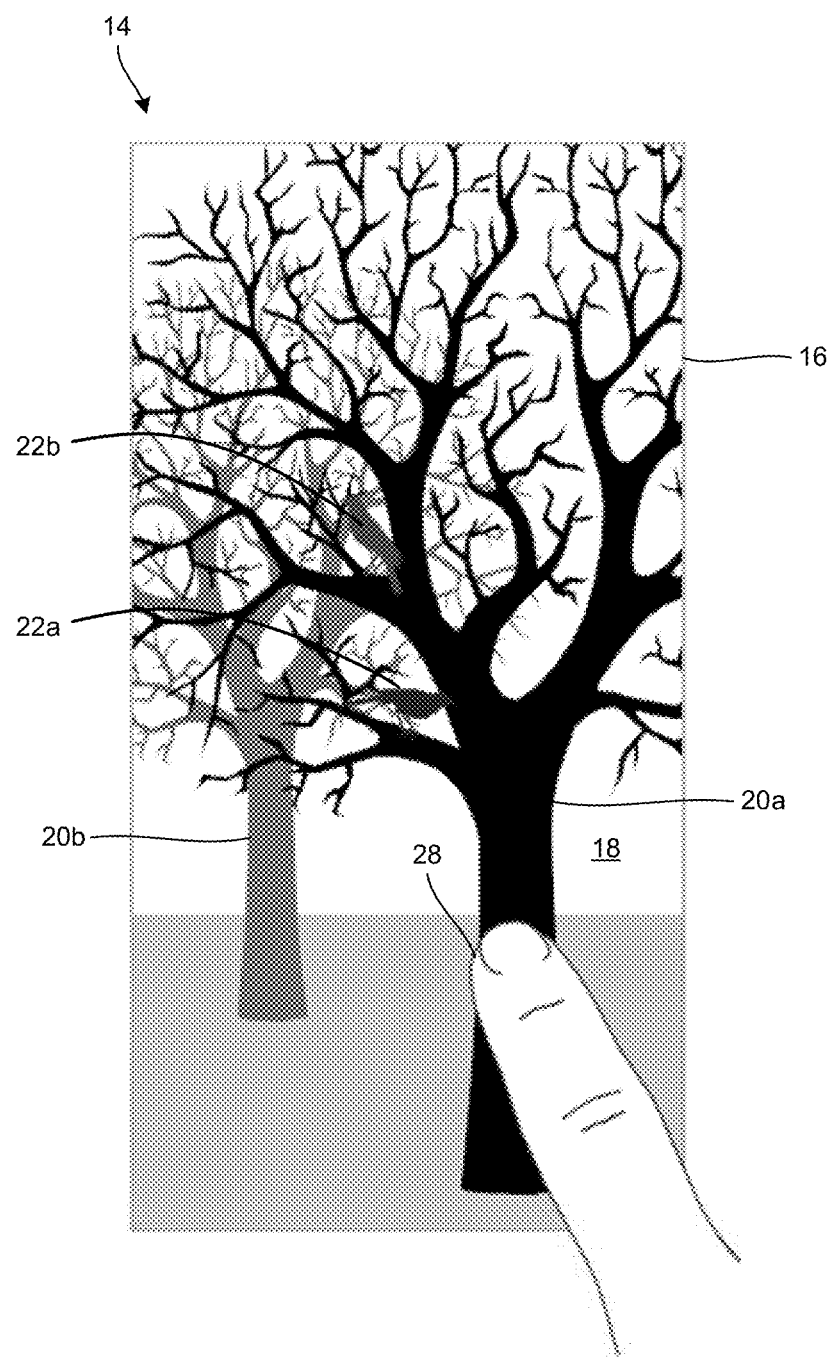
Figure 2C:
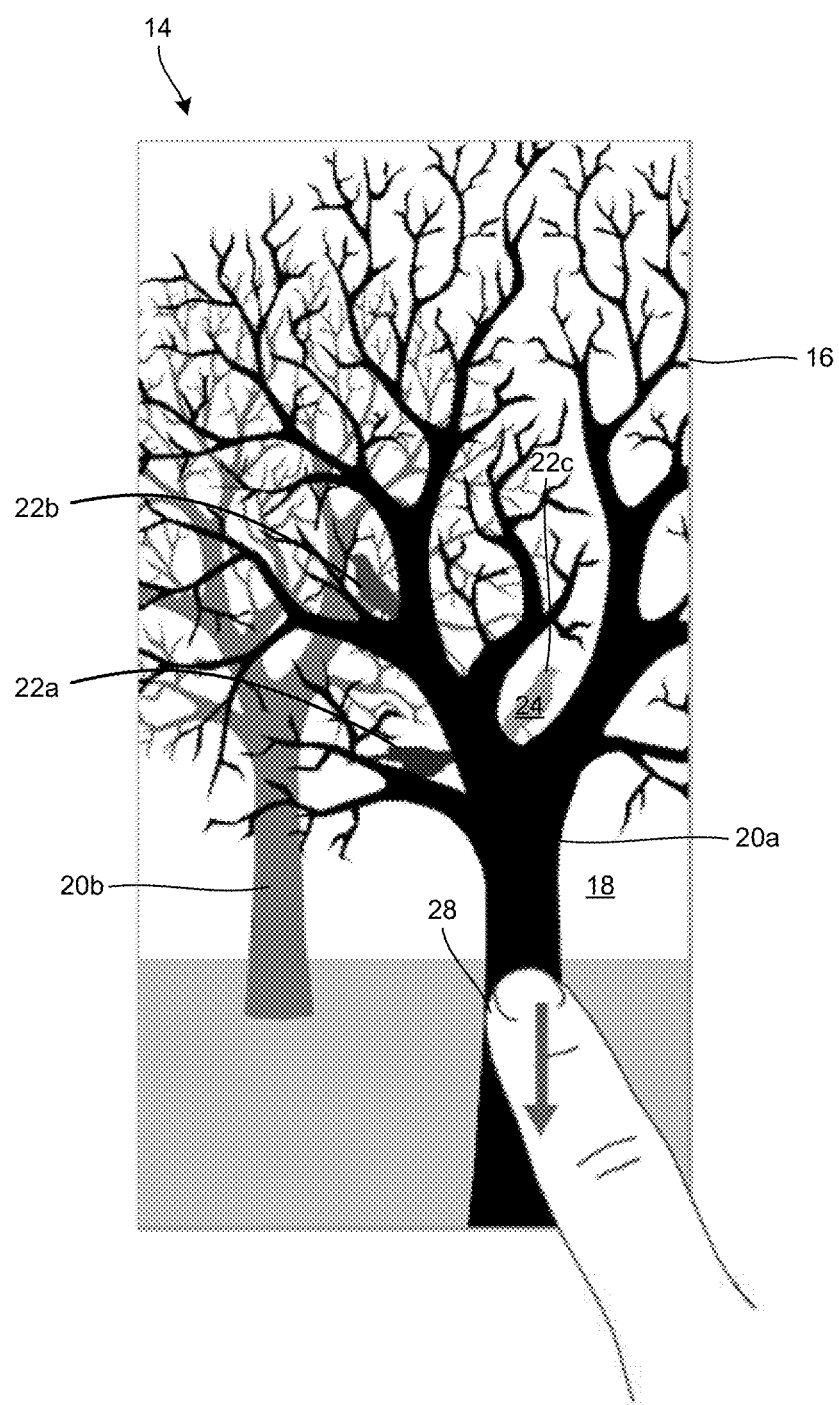

FIGS. 2A, 2B and 2C represent the simulated parallaxing of the exemplary scene 18 in response to user gestures of a horizontal swipe from left to right and then a vertical swipe from top to bottom. More specifically, starting with the scene 18 as shown in FIG. 2A, the user swipes to the right to change the simulated viewing angle to the left. The result is shown in FIG. 2B where the scene 18 is shown from a different simulated vantage where the scenery object 20a in the foreground (the darker tree in the example) appears to have moved to the right more than the scenery object 20b in the background (the lighter tree in the example). In the illustrated example, this simulated movement reveals two hidden objects 22a and 22b.

To continue this example, the user next swipes downward to further change the viewing angle upward. The result is shown in FIG. 2C where the scene 18 is shown from a different simulated vantage where the scenery object 20a in the foreground (the darker tree in the example) appears to have moved downward more than the scenery object 20b in the background (the lighter tree in the example). In the illustrated example, this further simulated movement reveals another hidden object 22c. In this example, the hidden objects 22 are in a simulated midground and the parallaxing of the scene causes the foreground scenery object 20a to appear to move more than the hidden objects 22, and the hidden objects 22 appear to move more than the background scenery object 20b. In some embodiments, an object that is hidden by a scenery object may become revealed by an initial user gesture and further gesturing may reveal another object that was hidden by the initially hidden object.

Next, the logical flow proceeds to block 32 where a determination is made as to whether the user has ended a user input sequence. In one embodiment, the end of the user input sequence is indicated by lifting of the fingertip 28 (or other object used to make gestures against the touch screen, such as a stylus) away from the display 16. This type of gesture is often referred to as a finger lift. The detection of the finger lift is used as part of the unlock process to detect when the user has finished gesturing to manipulate the scene 18 and performed requisite action to unlock the electronic device 10. Therefore, as will become more apparent, detecting the finger lift is part of the unlock security provided by the described techniques. If a finger lift is not detected in block 32, the logical flow may return to block 24 to continue to receive user input gestures and refreshing of the scene 18 in block 30.

If a finger lift is detected in block 32, the logical flow may proceed to block 34 where a determination is made as to whether appropriate user input in the form of a gesture or gestures was made by the user to unlock the electronic device 10. In one embodiment, the appropriate user input is a gesture or gestures to result in parallaxing of the displayed scene 18 so that the target object 24 is revealed (e.g., no longer hidden from being displayed on the display 16 by a scenery object 20).

In one embodiment, the appropriate user input includes multiple gestures that are carried out in a predetermined sequence. For instance, the target object 24 in the illustrated embodiment could be revealed by a diagonal swipe. However, the electronic device 10 may be configured to not unlock in response to the diagonal swipe and, instead, require a particular sequence of gesture inputs (e.g., in this exemplary case, a horizontal swipe to the right followed by a vertical swipe in a downward direction).

In another multi-gesture embodiment, to unlock the electronic device 10 the user may need to reveal two or more hidden objects 22 in a predetermined order.

If a determination is made that appropriate gestures were input by the user to unlock the electronic device 10 (a positive determination in block 34), then the logical flow may proceed to block 36. In block 36, the electronic device 10 is unlocked. Following unlocking of the electronic device 10, the user may have access to features and functions of the electronic device 10 that were not available when the electronic device 10 was in the locked state. The electronic device 10 will remain in the unlocked state until an event occurs to return the electronic device 10 to the locked state. Exemplary events to return the electronic device 10 to the locked state include elapsing of a predetermined amount of time without user interaction with the electronic device 10 or user input to lock the electronic device 10.

If a negative determination is made in block 34, the logical flow may proceed to block 38. In block 38, a determination is made as to whether to initiate a lock-out state of the electronic device 10. A positive determined may be made in block 38, for example, after a predetermined number of failed attempts to unlock the electronic device 10. Upon a positive determination in block 38, the logical flow may proceed to block 40 where the user may be required to wait a predetermined amount of time before additional unlock attempts may be made. Alternatively, or if more than one positive determinations were made in block 38 since the last successful unlock attempt, a different unlock technique (possibly with a higher authentication level) may be required to unlock the electronic device. Different unlock techniques may include, for example, entry of a password, use of biometrics, resetting the electronic device, etc. If a negative determination is made in block 38, the logical flow may return to block 12.

The unlock techniques using the scene 18 have low demands on the user's ability to remember and recall a password, PIN code, or similar information. Instead, the user need only remember the rough location of an object in a scene from which the user will receive ample and playful visual feedback. In one embodiment, tell-tale smudges on the display 16 resulting from repeating the same unlocking gestures may be reduced by an adaptation of the above disclosed technique. In this adaptation, when the unlock screen 14 is initially display, the scene 18 may be shown from one of plural predetermined perspectives or from a randomized perspective. In this embodiment, the appearance of the unlock screen 14 will vary and the gestures used to unlock the electronic device 10 will vary in a corresponding nature. As the user becomes familiar with the scene 18, it will become less burdensome to "find" the target object in these circumstances.

Another way to vary the gestures used to unlock the electronic device 10 is to vary the location of the target object 24 within the scene 18. This would force the user to search through the scene 18 for the target object 24, but may increase security and/or may result in a more playful experience for the user.

In another embodiment, the user input to unlock the electronic device 10 includes gestures to reveal the target object 24 and additional actions. For example, the input may include revealing the target object 24 and then "jiggling" the scene 18 by moving the user's fingertip 28 quickly back-and-forth. The "jiggling" action may initiate an animation of the target object 24 (e.g., in the illustrate embodiment, cause the bird to fly away) before transitioning to a home screen or other graphical user interface (GUI) of the electronic device 10. In one embodiment, the jiggling or other action may be the end of the user input sequence used in block 32. The additional action that forms part of the gestures that satisfy the input requirements for unlocking the electronic device 10 need not be a touch screen input. For instance, the additional action could be shaking of the entire electronic device 10. To unlock the electronic device 10, the gestures and additional actions may need to be carried out in a predetermined sequence and/or in a particular manner (e.g., "jiggle" the scene 18 up and down rather than left and right, or "jiggle" the scene a predetermined number of times).

Figure 3:
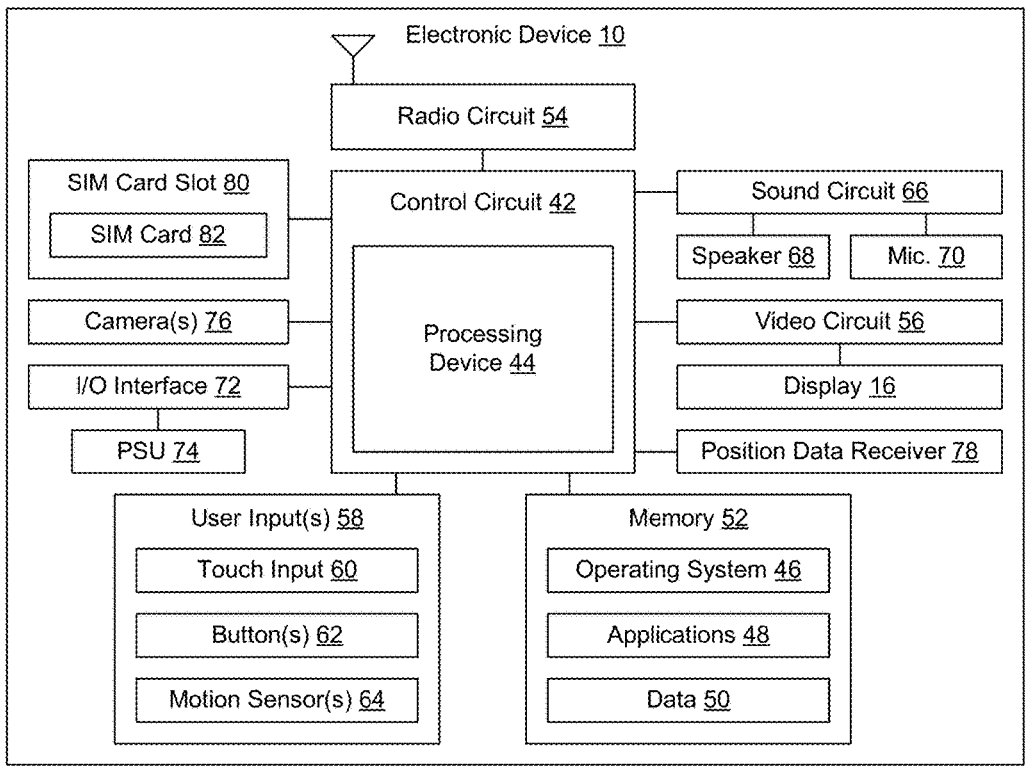
FIG. 3 is a schematic block diagram of the electronic device.

With additional reference to FIG. 3, a schematic block diagram of the electronic device 10 in its exemplary form as a mobile telephone is illustrated. The electronic device 10 includes a control circuit 42 that is responsible for overall operation of the electronic device 10, including controlling whether the electronic device in the locked state or the unlocked state. The control circuit 42 includes a processor 44 that executes an operating system 46 and various applications 48. Typically, control over the locked/unlocked state of the electronic device 10 is embodied as part of the operating system 46. In other embodiments, this functionality may be embodied as a dedicated application.

The operating system 46, the applications 48, and stored data 50 (e.g., data associated with the operating system 46, the applications 48, and user files), are stored on a memory 52. The operating system 46 and applications 48 are embodied in the form of executable logic routines (e.g., lines of code, software programs, etc.) that are stored on a non-transitory computer readable medium (e.g., the memory 52) of the electronic device 10 and are executed by the control circuit 42. The described operations may be thought of as a method that is carried out by the electronic device 10.

The processor 44 of the control circuit 42 may be a central processing unit (CPU), microcontroller, or microprocessor. The processor 44 executes code stored in a memory (not shown) within the control circuit 42 and/or in a separate memory, such as the memory 52, in order to carry out operation of the electronic device 10. The memory 52 may be, for example, one or more of a buffer, a flash memory, a hard drive, a removable media, a volatile memory, a non-volatile memory, a random access memory (RAM), or other suitable device. In a typical arrangement, the memory 52 includes a non-volatile memory for long term data storage and a volatile memory that functions as system memory for the control circuit 42. The memory 52 may exchange data with the control circuit 42 over a data bus. Accompanying control lines and an address bus between the memory 52 and the control circuit 42 also may be present. The memory 52 is considered a non-transitory computer readable medium.

The electronic device 10 includes communications circuitry that enables the electronic device 10 to establish various wireless communication connections. In the exemplary embodiment, the communications circuitry includes a radio circuit 54. The radio circuit 54 includes one or more radio frequency transceivers and an antenna assembly (or assemblies). In the case that the electronic device 10 is a multi-mode device capable of communicating using more than one standard and/or over more than one radio frequency band, the radio circuit 54 represents one or more than one radio transceiver, one or more than one antenna, tuners, impedance matching circuits, and any other components needed for the various supported frequency bands and radio access technologies. The radio circuit 54 further represents any radio transceivers and antennas used for local wireless communications directly with another electronic device, such as over a Bluetooth interface.

The electronic device 10 further includes the display 16 for displaying information to a user. The display 16 may be coupled to the control circuit 42 by a video circuit 56 that converts video data to a video signal used to drive the display 16. The video circuit 56 may include any appropriate buffers, decoders, video data processors and so forth.

The electronic device 10 may include one or more user inputs 58 for receiving user input for controlling operation of the electronic device 10. Exemplary user inputs include, but are not limited to, a touch input 60 that overlays or is part of the display 16 for touch screen functionality, one or more buttons 62, motion sensors 64 (e.g., gyro sensors, accelerometers), and so forth.

The electronic device 10 may further include a sound circuit 66 for processing audio signals. Coupled to the sound circuit 66 are a speaker 68 and a microphone 70 that enable audio operations that are carried out with the electronic device 10 (e.g., conduct telephone calls, output sound, capture audio for videos, etc.). The sound circuit 66 may include any appropriate buffers, encoders, decoders, amplifiers and so forth.

The electronic device 10 may further include one or more input/output (I/O) interface(s) 72. The I/O interface(s) 72 may be in the form of typical electronic device I/O interfaces and may include one or more electrical connectors for operatively connecting the electronic device 10 to another device (e.g., a computer) or an accessory (e.g., a personal handsfree (PHF) device) via a cable. Further, operating power may be received over the I/O interface(s) 72 and power to charge a battery of a power supply unit (PSU) 74 within the electronic device 10 may be received over the I/O interface(s) 72. The PSU 74 may supply power to operate the electronic device 10 in the absence of an external power source.

The electronic device 10 also may include various other components. As an example, one or more cameras 76 may be present for taking photographs or video, or for use in video telephony. As another example, a position data receiver 78, such as a global positioning system (GPS) receiver, may be present to assist in determining the location of the electronic device 10. The electronic device 10 also may include a subscriber identity module (SIM) card slot 80 in which a SIM card 82 is received. The slot 80 includes any appropriate connectors and interface hardware to establish an operative connection between the electronic device 10 and the SIM card 82.

Figure 4:
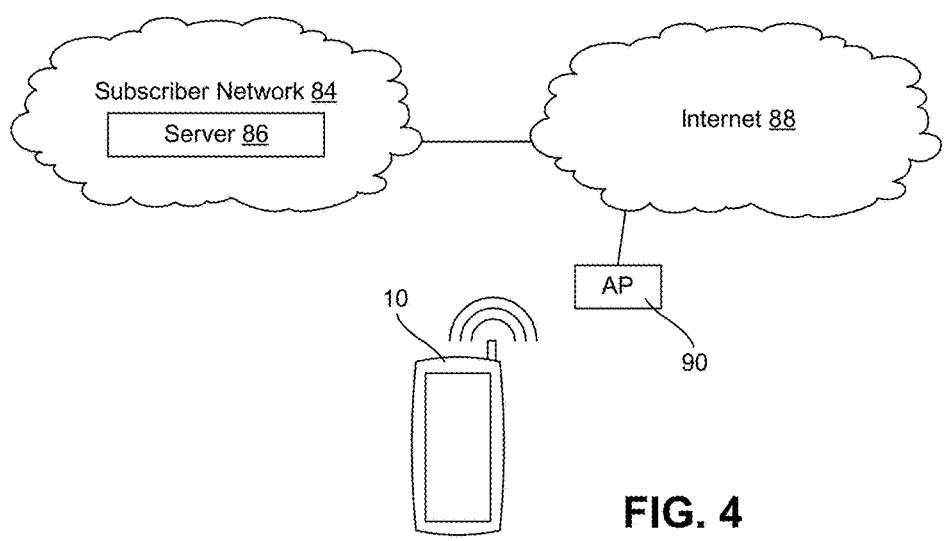
FIG. 4 is a schematic view of a communication environment for the electronic device.

Referring to FIG. 4, schematically shown is a communications environment for the electronic device 10. In the communications environment, the electronic device 10 may carry out wireless communications. To conduct wireless communications, the electronic device 10 establishes network connectivity with one or more networks. Typically, the connection is made to a subscriber network 84 that services the physical geo-location of the electronic device 10. The network 84 may provide Internet access to the electronic device 10. In most cases, the network 84 is a cellular network operated by a respective cellular service telephone company. Exemplary network access technologies for the network 84 are typically cellular circuit-switched network technologies and include, but are not limited to, global system for mobile communications (GSM), code division multiple access (CDMA), wideband CDMA (WCDMA), and advanced or alternative versions of these standards. The networks may support general packet radio service (GPRS), universal mobile telecommunications system (UMTS), 3G, 4G long-term evolution (LTE), or other standards.

The network 84 supports communications such as, but not limited to, voice communications (e.g., telephone calls), video communications (e.g., video telephony), messaging (e.g., instant messaging, text and multimedia messaging, and electronic mail messaging), data transfers, and Internet browsing. To support the communications activity of the electronic device 10, the network 84 may include a server 86 (or servers). The server 86 may be configured as a typical computer system used to carry out server functions and may include a processor configured to execute software containing logical instructions that embody the functions of the server 86 and a memory to store such software and related data.

The communications between the electronic device 10 and the subscriber network 84 may be established by way of a transmission medium (not specifically illustrated) of the subscriber network 84. The transmission medium may be any appropriate device or assembly, but is typically an arrangement of communications base stations (e.g., cellular service towers, also referred to as "cell" towers).

In some situations, the electronic device 10 may communicate with the Internet 88 via an access point 90 of a local area network (LAN) using a packet-switched protocol, such as IEEE 802.11a, IEEE 802.11b, IEEE 802.11g or IEEE 802.11n (commonly referred to as WiFi). Other LAN-based protocols are possible, such as WiMax under IEEE 802.16. The access point 90 is typically, but not necessarily, a wireless router.

Although certain embodiments have been shown and described, it is understood that equivalents and modifications falling within the scope of the appended claims will occur to others who are skilled in the art upon the reading and understanding of this specification.

What is claimed is:

1. A method of unlocking an electronic device, comprising:
    displaying a lock screen containing a simulated parallaxing three-dimensional scene on a touch screen of the electronic device;
    receiving a first user input gesture on the touch screen;
    while the first user input gesture is being performed on the touch screen, parallaxing the displayed scene in response to the input gestures to simulate at least one of a change in viewing angle or a change in viewing position of the scene;
    ending the first user input gesture by lifting a finger from the touch screen; and
    in response to ending the first user input gesture, determining if the parallaxed scene displays at least one object that satisfies input requirements to unlock the electronic device and, if so, unlock the electronic device;
    wherein the first user input gesture satisfies the input requirements to unlock the electronic device if the parallaxing of the displayed scene in accordance with the first user input gesture reveals a predetermined target object that is hidden by a scenery object prior to parallaxing of the displayed scene in accordance with the first user input gesture.

2. The method of claim 1, wherein the first user input gesture satisfies the input requirements to unlock the electronic device if the revealing of the hidden object is accomplished by two or more distinct motions performed in a predetermined order.

3. The method of claim 1, wherein the first user input gesture satisfies the input requirements to unlock the electronic device if two or more hidden objects are revealed in a predetermined order.

4. The method of claim 1, wherein a location of the hidden object in the displayed scene changes in a subsequent displaying of the lock screen.

5. The method of claim 1, wherein a starting vantage point of the displayed scene changes in a subsequent displaying of the lock screen.

6. The method of claim 1, wherein the parallaxing of the displayed scene reveals a hidden object, and the method further comprises animating or changing a characteristic of the revealed object.

7. An electronic device having a locked state in which a function of the electronic is unusable and an unlocked state in which the function is usable, comprising:
    a touch screen; and
    a control circuit configured to:
        display a lock screen containing a simulated parallaxing three-dimensional scene on the touch screen;
        receive signals corresponding to a first user input gesture on the touch screen;
        while the first user input gesture is being performed on the touch screen, parallax the displayed scene in response to the input gestures to simulate at least one of a change in viewing angle or a change in viewing position of the scene;
    detect an end of the first user input gesture when a finger is lifted from the touch screen; and
        in response to ending the first user input gesture, determine if the parallaxed scene displays at least one object that satisfies input requirements to unlock the electronic device and, if so, unlock the electronic device;
    wherein the first user input gesture satisfies the input requirements to unlock the electronic device if the parallaxing of the displayed scene in accordance with the first user input gesture reveals a predetermined target object that is hidden by a scenery object prior to parallaxing of the displayed scene in accordance with the first user input gesture.

8. The electronic device of claim 7, wherein the first user input gesture satisfies the input requirements to unlock the electronic device if the revealing of the hidden object is accomplished by two or more distinct motions performed in a predetermined order.

9. The electronic device of claim 7, wherein the first user input gesture satisfies the input requirements to unlock the electronic device if two or more hidden objects are revealed in a predetermined order.

10. The electronic device of claim 7, wherein a location of the hidden object in the displayed scene changes in a subsequent displaying of the lock screen.

11. The electronic device of claim 7, wherein a starting vantage point of the displayed scene changes in a subsequent displaying of the lock screen.

12. The electronic device of claim 7, wherein the parallaxing of the displayed scene reveals a hidden object and the controller initiates an animation or a change in a characteristic of the revealed object.

13. The method of claim 1, wherein the parallaxing the displayed scene involves changing a relative position of a scenery object and a predetermined target object that is hidden by the scenery object and causing the scenery object to move more than the predetermined target object.

14. The electronic device of claim 7, wherein the parallaxing the displayed scene involves changing a relative position of a scenery object and a predetermined target object that is hidden by the scenery object and causing the scenery object to move more than the predetermined target object.

* * * * *